United States Patent

[11] 3,618,690

| [72] | Inventor | Howard L. Johnson |
| | | Joliet, Ill. |
| [21] | Appl. No. | 826,093 |
| [22] | Filed | May 20, 1969 |
| [45] | Patented | Nov. 9, 1971 |
| [73] | Assignee | Caterpillar Tractor Co. |
| | | Peoria, Ill. |

[54] DAMPING AND AIR-PURGING MEANS FOR RELIEF VALVE
2 Claims, 1 Drawing Fig.

[52] U.S. Cl. ..................................... 137/514.7,
137/525, 251/DIG. 1
[51] Int. Cl. ..................................... F16k 21/10
[50] Field of Search ..................... 137/514–514.7,
525; 251/DIG. 1

[56] References Cited
UNITED STATES PATENTS

| 3,083,727 | 4/1963 | Douglas | 137/489 |
| 3,529,624 | 9/1970 | Cryder et al. | 137/514.5 |
| 609,726 | 8/1898 | Ball | 137/514.3 |
| 963,385 | 7/1910 | Oleson | 137/514.5 |
| 1,291,609 | 1/1919 | Nichols | 137/514.7 |
| 1,366,151 | 1/1921 | Astrom | 137/525 |
| 1,661,886 | 3/1928 | Eisenhauer | 137/525 X |
| 2,367,989 | 1/1945 | Alders | 137/514.3 |
| 2,392,009 | 1/1946 | Stern | 137/514.3 |
| 2,745,431 | 5/1956 | Jensen | 137/514.7 |
| 2,927,605 | 3/1960 | Stephens | 137/514.5 |
| 2,954,047 | 9/1960 | Faltejsek et al. | 137/514.5 X |

FOREIGN PATENTS

| 6,611,202 | 2/1968 | Netherlands | 137/525 |

Primary Examiner—Herbert F. Ross
Assistant Examiner—David J. Zobkiw
Attorney—Fryer, Tjensvold, Feix, Phillips & Lempio ABSTRACT: A spring-closed relief valve in which the spring chamber receives liquid escaping past the valve to act as a damping medium, the spring chamber is provided with a check valve to permit controlled escape of liquid and purge the system in which the relief valve is used of air entrained in the liquid. The check valve comprises a plurality of passages through a cylindrical wall all opening into an annular groove circumscribing the wall and an elastic ring in the groove normally closing the passages.

PATENTED NOV 9 1971 3,618,690
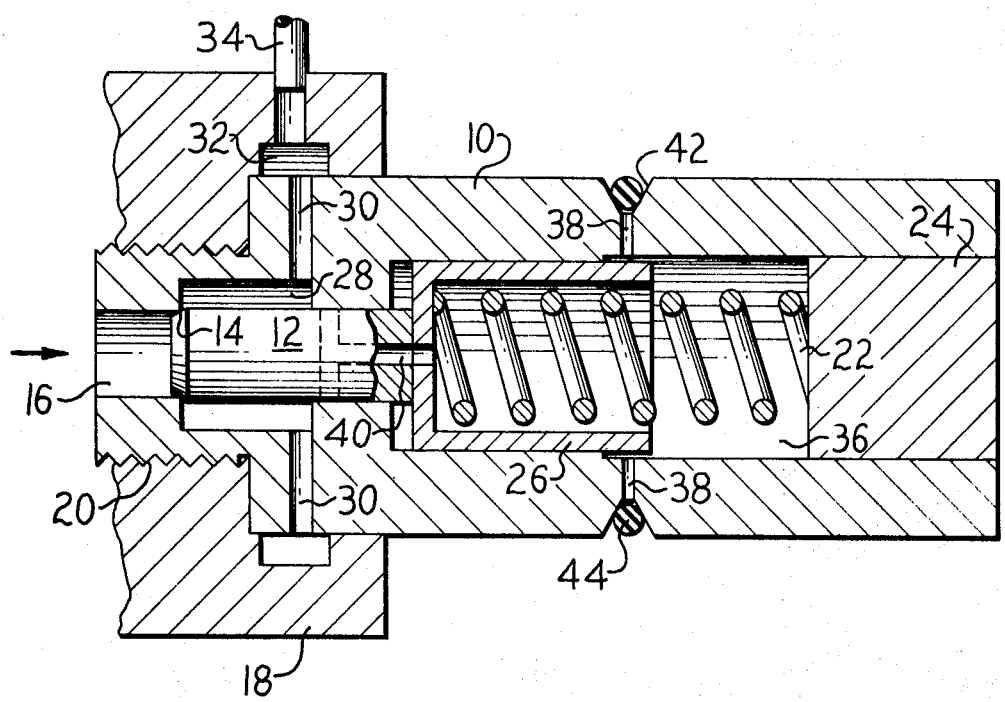
INVENTOR
HOWARD L. JOHNSON
BY
ATTORNEYS

DAMPING AND AIR-PURGING MEANS FOR RELIEF VALVE

The relief valve of the present invention may be used in a hydraulic system such as is employed for actuating various components of a motor vehicle or earthmoving machine. It is designed to relieve excessive pressure from a hydraulic circuit (not shown) to tank and the action of the valve is cushioned or damped to prevent chatter and erratic operation. A simple and inexpensive check valve is used in association with the damping chamber to control pressure therein and to purge air from the system. A more detailed description of the construction and operation of the invention follows with reference to the accompanying drawing.

The drawing is a central sectional view taken through a relief valve with damping and air-purging means embodying the present invention.

The valve shown in the drawing comprises a body 10 with a valve element 12 mounted for sliding movement therein and adapted to seat, as at 14, to prevent flow of liquid through a passage 16 which is in communication with a source of liquid under high pressure, to the tank of a hydraulic system, except under extreme pressure conditions. The valve body 10 is connected with an adapter 18 which is a part of the tank (not shown) by means of a threaded connection 20. A spring 22 disposed within a spring chamber within the valve acts between a closure 24 at one end of the valve housing and a cylinder 26 which is reciprocably mounted in the chamber and bears against the valve element 12. The pressure entering the valve at 16, when excessive, will overcome the force of the spring 22 opening the valve permitting discharge of liquid through a chamber 28, radial passages 30, an annular groove 32 and a conduit 34 which directs the discharged fluid to a low-pressure sump or tank. To damp the action of the valve under the effect of surges of high-pressure liquid, the chamber of the spring 22, which is shown at 36, contains liquid which may be forced outwardly of the chamber through a plurality of restricted radial passages 38. Liquid from these passages will also be collected and directed to a low-pressure sump by means not shown.

Thus, the piston 26 and chamber 36 act in the manner of a dash pot to restrict the speed of movement of the valve element 12 as it opens. A supply of liquid is maintained in the spring chamber by leakage from chamber 28 past the sides of the valve element 12 and a T-shaped passage 40 therein. The outer ends of the restricted passages 38 communicate with a V-shaped groove 42 which encircles the body 10. An elastic torus 44 is contained within this groove and exerts inward pressure against the sidewalls of the groove to prevent outward flow of fluid through the orifices 38 except under influence of pressure from within the chamber 36. This acts as a check valve for all of the orifices 38 and permits purging of air from the spring chamber.

Because the valve body is held in place by a threaded connection, it cannot conveniently be indexed during assembly to insure that a single outlet passage 38 would be disposed in its upper portion where air collects. Consequently, several passages are provided throughout the periphery of the body and at least one will be so upwardly disposed that it will serve to discharge air. Consequently, the single torus will act as the check valve for any one of a number of passages and at a very low cost compared to other means of providing such valves. This check valve arrangement also prevents air from returning to the chamber 36 as the valve element 12 is moving toward its closed position. The check valve has a still further function of preventing escape of liquid from the chamber 36 when the hydraulic system is not in use and liquid under pressure is not available to keep the chamber full. Consequently, when the system is again placed in use, the liquid in chamber 36 will be present immediately to perform its intended function.

What is claimed is:

1. A relief valve comprising a housing, a valve element reciprocally mounted in said housing, a normally closed chamber in said housing being formed by a piston connected to said valve element and said housing, spring means mounted in said chamber for urging said valve element in a first direction for normally closing an inlet to prevent liquid flow through said relief valve to an outlet thereof, and damping means for damping movement of said valve element in a second direction, opposite to said first direction, when said inlet is opened to communicate with said outlet, said damping means comprising first passage means comprising a passageway through said valve element for communicating said liquid to said chamber to resist movement of said valve element in said second direction, restricted passage means, independent of said first passage means, including a clearance between said piston and said housing for automatically relieving the pressure of the liquid in said chamber when such pressure exceeds a predetermined level, and further including at least one port extending through said housing, check valve means normally closing said at least one port, and said valve means including an annular groove circumscribing the exterior of the housing and communicating with said port, and an elastic ring disposed in said groove to normally close said port.

2. The relief valve of claim 1 further including a plurality of ports radially disposed within said groove and being normally covered by said elastic ring.

* * * * *